United States Patent
Kuwahara et al.

(10) Patent No.: US 6,894,799 B2
(45) Date of Patent: May 17, 2005

(54) FACSIMILE APPARATUS

(75) Inventors: Tetsuya Kuwahara, Kyoto (JP); Shinji Kawasaki, Plano, TX (US)

(73) Assignee: Murata Kikai Kabushiki Kaisha, Kyoto (JP)

(*) Notice: Subject to any disclaimer, the term of this patent is extended or adjusted under 35 U.S.C. 154(b) by 849 days.

(21) Appl. No.: 09/730,695

(22) Filed: Dec. 6, 2000

(65) Prior Publication Data

US 2002/0051170 A1 May 2, 2002

(30) Foreign Application Priority Data

Dec. 15, 1999 (JP) ............................................ 11-355363

(51) Int. Cl.⁷ ............................ G06F 15/00; H04N 1/00; H04M 11/00
(52) U.S. Cl. ...................... 358/1.15; 358/1.16; 358/400; 358/407; 379/93.07; 379/93.23; 379/100.09
(58) Field of Search .............................. 358/1.15, 1.16, 358/400, 403, 404, 407, 438, 444; 379/93.07, 100.09, 93.23; 455/412.1; 713/202, 200; 709/200, 201; 718/101; 399/81; 382/305, 307

(56) References Cited

U.S. PATENT DOCUMENTS 5,535,015 A * 7/1996 Yoshida ........................ 358/438

FOREIGN PATENT DOCUMENTS

JP 05-260279 10/1993
JP 08084236 A * 3/1996 ............ H04N/1/32

* cited by examiner

Primary Examiner—Kimberly Williams
Assistant Examiner—Thomas J. Lett
(74) Attorney, Agent, or Firm—Hogan & Hartson, LLP (57) ABSTRACT

A facsimile machine (F) that is capable of performing a confidential transmission, broadcast transmission, etc. by batch transmission. If a user of the facsimile machine wants to send a plurality of image data to a recipient, for instance, confidentially and simultaneously at a specified time, the image data is accumulated in a memory box (5a) for confidential batch transmission. The image data is then sent to the recipient by batch transmission. The facsimile machine (F) determines whether image data is for batch transmission or real time transmission. If the image data is for real time transmission, it is not stored in the memory box (5a).

11 Claims, 6 Drawing Sheets

FACSIMILE APPARATUS

BACKGROUND OF THE INVENTION

1. Field of the Invention

The present invention generally relates to a facsimile machine having a plurality of transmission functions, and more particularly to a facsimile machine that is capable of simultaneously sending a plurality of image data to a specified recipient (i.e., batch transmission).

2. Description of the Related Art

In the interest of curtailment of expenses or other reasons, some facsimile machines are equipped with a batch transmission function, which enables the facsimile machine to simultaneously send a plurality of image data to a certain recipient.

Further, some facsimile machines have a delayed transmission function, which sends data to a recipient at a specified time, for example, during the night. This transmission function also contributes to cost reduction since telephone fees are inexpensive at night.

These transmission functions use a memory for storing one or more image data.

In the meantime, there are known other transmission functions for the facsimile machines; (1) a confidential transmission function for sending image data to a particular recipient only (used when a transmitter does not want other unauthorized persons to see that data on the receiving side), (2) an F code transmission function for sending data and causing a mailbox on a memory of a recipient to store that data, (3) a relay transmission function for first sending data to a relay station such that the data is stored in a memory of the relay station, and then sending the same data to a recipient from the relay station, and (4) broadcast transmission function for sending same image data to a plurality of recipients. In addition, either the confidential transmission function or F code transmission function is sometimes combined with the broadcast transmission function. Such combination is referred to as the function (5) in this specification. Facsimile machines possessing these transmission functions (1) to (5) are prevailing.

However, if a facsimile user wants to send a plurality of data to a certain recipient by batch transmission, and also wants to apply one of the above-mentioned functions (1) to (5), a conventional facsimile machine cannot execute both of them. For instance, the batch transmission and confidential transmission cannot be executable at the same time. In this case, a plurality of image data to be transmitted to a recipient is not accumulated in a memory for batch transmission; instead, each image data is immediately sent to the recipient (real time transmission) confidentially or stored for a delayed transmission.

The above functions (1) to (5) can be combined with the delayed transmission function, but only one of the functions can be executable at a specified time. A plurality of image data cannot be stored in a memory at different times for later simultaneous transmission (batch transmission) with one of the functions (1) to (5). Of course, it is not possible for a conventional facsimile machine to categorize a plurality of image data obtained at different times into five groups with respect to the functions (1) to (5) and store them in a plurality of memories for respective batch transmissions.

Accordingly, even if the facsimile machine on the transmission side has or prepares a box for batch transmission dedicated to a specified recipient, image data is not stored in the box if the functions (1) to (5) are assigned to the facsimile machine. Thus, if a plurality of image data should be sent, real time transmission and/or delayed transmission take place repeatedly or frequently.

SUMMARY OF THE INVENTION

An object of the present invention is to provide a multi function facsimile machine that can overcome the above-described problems. Specifically, the object of the invention is to enable the batch transmission together with the above-mentioned functions (1) to (5) such as confidential transmission and F code transmission.

This object is achieved by providing a memory box for storing a plurality of image data for batch transmission and designing this memory box to be also usable for the above-mentioned transmissions.

According to one aspect of the present invention, there is provided a facsimile apparatus capable of performing batch transmission and other transmissions such as confidential transmission, relay transmission, F code transmission and broadcast transmission, including a memory box for storing a plurality of image data to be sent to a designated recipient by batch transmission (batch transmission recipient), a facsimile module for sending the image data to the batch transmission recipient from the memory box by batch transmission, and a controller for storing the image data in the memory box if one of recipients designated in the other transmissions match the batch transmission recipient.

For example, when a user of the facsimile machine wants to send a plurality of data to a plurality of recipients by confidential transmission and one of the recipients for this confidential transmission matches a batch transmission recipient, these data is accumulated in the memory box and sent to the batch transmission recipient at a specified time (e.g., at night) simultaneously. Therefore, each data is not transmitted by real time transmission or delayed transmission to the batch transmission recipient. For other recipients, data is sent by real time transmission or delayed transmission. A plurality of memory boxes may be prepared for the respective transmission functions in accordance with specified transmission times, and there may be more than one batch transmission recipient.

The controller may allow a user to select either the plurality of image data should be stored in the memory box or not even if one of the recipients designated in the other transmissions match the batch transmission recipient. The batch transmission recipient is specified beforehand so that the user may not want to use batch transmission at a particular timing. For instance, if the user wants to send image data immediately in an emergency situation, the user can select the real time transmission even if the recipient is the batch transmission recipient.

DETAILED DESCRIPTION OF THE INVENTION

Embodiments of the present invention will now be described with reference to the accompanying drawings.

Figure 1:
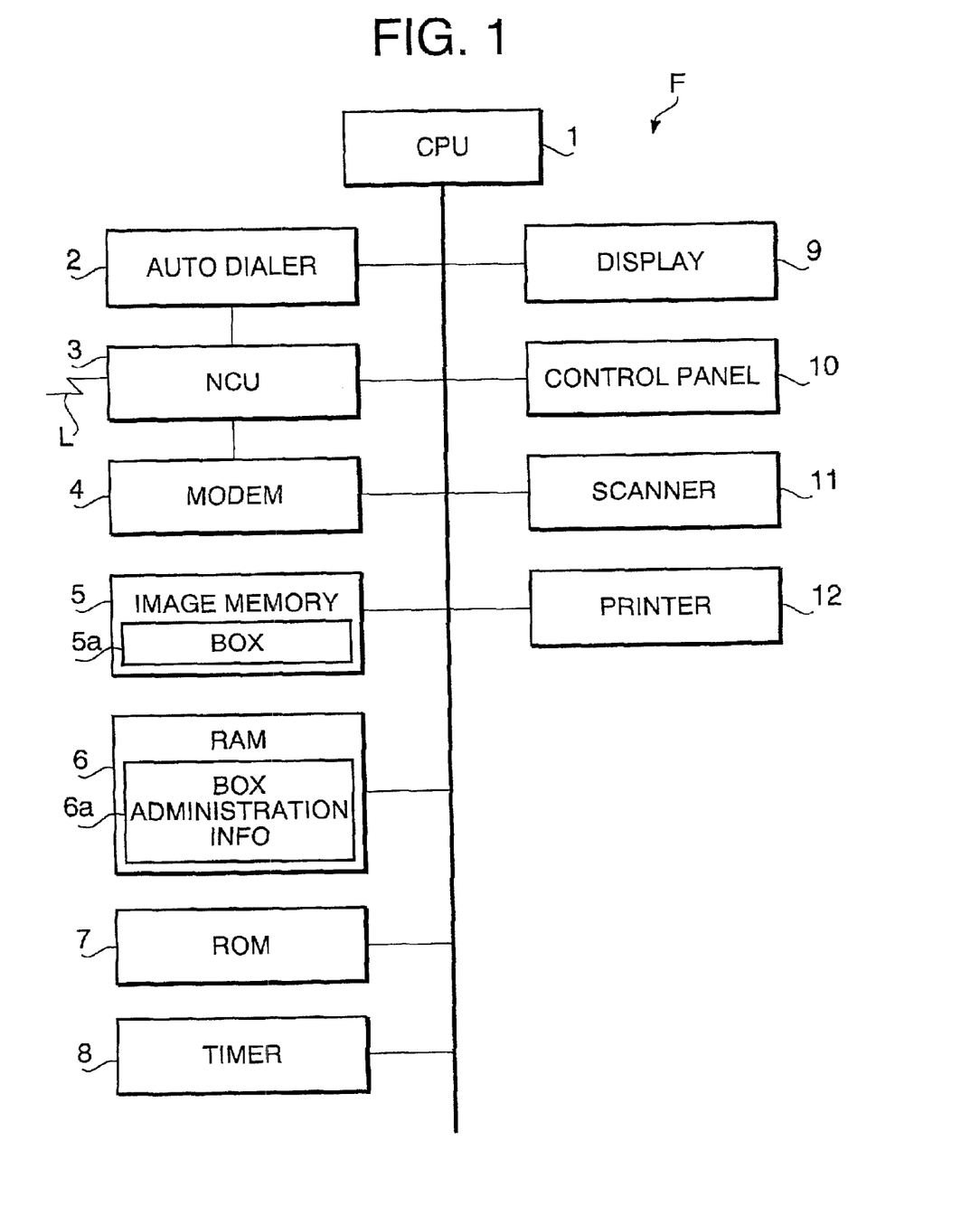
FIG. 1 is a block diagram schematically showing an inside structure of a facsimile machine according to the present invention.

Referring to FIG. 1, illustrated is a facsimile machine F according to the present invention, that includes a main controller 1 such as CPU, an automatic dialing unit 2 for automatically calling a recipient, NCU (network control unit) 3 for controlling connection to a communication line or network L, a modem 4 for modulating and demodulating signals for image data transmission and reception via facsimile, an image memory 5 for storing image data for facsimile transmission, RAM 6 for storing memory box administration information 6a and other information, ROM 7 for storing control programs and other data and information, and a timer 8. The image memory 5 has at least one box (memory box) 5a provided thereon for storing image data for batch transmission. The respective memory box 5a is allotted numbering from one.

The facsimile machine F also includes a display 9 such as LCD with LEDs and touch keys (touch screen) for allowing a user to input certain instructions, information, data, symbols and numbers, a control panel or operation unit 10 having various operation keys, a scanner 11 for reading in a document set into the facsimile machine F, and a printer 12 for recording image data on a recording sheet.

This facsimile machine F has a transmission function for sending image data, which is scanned by the scanner 11, to a recipient over the communication line L, and a reception function for receiving image data from a remote machine over the communication line L and printing (or displaying) that data. The printing is performed by the printer 12.

The transmission function includes a delayed transmission function for temporarily storing single image data, which is scanned by the scanner 11, in the image memory 5 and then sending it to a recipient at a specified time, and a batch transmission function for sequentially accumulating a plurality of image data, which is scanned by the scanner 11 respectively, into the memory box 5a and simultaneously sending these data to one or more recipients at a predetermined time.

The facsimile machine F also possesses the following functions: (1) a confidential transmission function for sending image data to an authorized recipient only, (2) an F code transmission function for sending data to a mail box on a memory of a recipient, (3) a relay transmission function for sending data to a relay station such that the data is stored in a memory of the relay station and sending the same data to a plurality of recipients from the relay station, (4) a broadcast transmission function for sending same data to a plurality of recipients, (5) combination of the confidential transmission function and broadcast transmission function, and combination of the F code transmission function and broadcast transmission function.

The illustrated facsimile machine F can perform these five transmission functions by batch transmission. A plurality of image data for these transmission functions is stored in the memory boxes 5a, and later transmitted to one or more recipients by batch transmission respectively. FIG. 1 illustrates only one memory box 5a for the sake of simpler illustration and easier understanding. The box administration information 6a is used to administer these memory boxes 5a (will be described in detail).

Figure 2A:
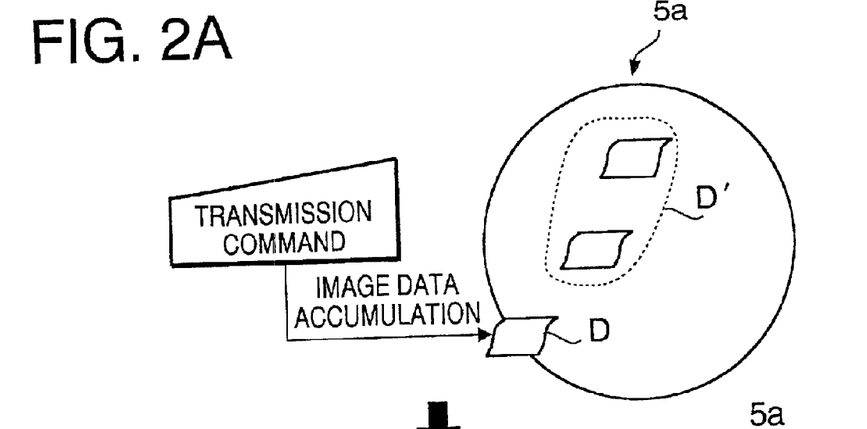
FIG. 2A conceptionally illustrates image data accumulation in a memory box for batch transmission.
Figure 2B:
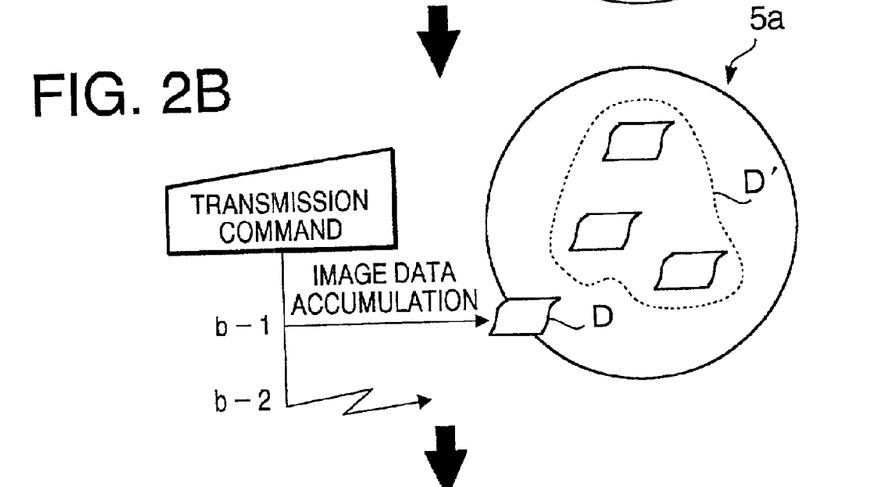
FIG. 2B illustrates additional data accumulation in the memory box and immediate data transmission that occur after FIG. 2A.
Figure 2C:
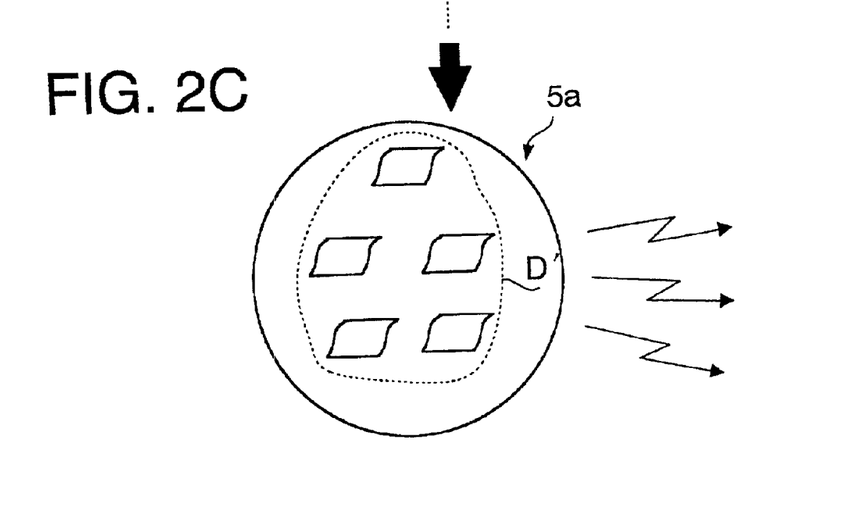
FIG. 2C illustrates data transmission by batch transmission that occurs after FIG. 2B.

Referring now to FIGS. 2A to 2C, illustrated are various charts, which indicate flow of image data and data accumulation in the memory box 5a respectively, when one of the transmission functions (1) to (5) (e.g., confidential transmission) is performed twice or more. Specifically, FIG. 2A illustrates accumulation of the image data in the memory box 5a for batch transmission to a single recipient, FIG. 2B illustrates another data accumulation in the memory box 5a and real time transmission of data when sending the image data to a batch transmission recipient and a non-batch transmission recipient after FIG. 2A, and FIG. 2C illustrates the batch transmission at a specified time.

In FIG. 2A, the recipient is a batch transmission recipient, and scanned image data D is stored in the memory box 5a prepared for confidential transmission. A group of another image data D' is already stored in the memory box 5a. This image data D is put into the broke line circle and will belong to the data group D'. In FIG. 2B, one of the recipients is a batch transmission recipient, and the other recipient is a non-batch transmission (or normal transmission) recipient. Newly scanned image data D for batch transmission is stored in the box 5a (b-1) and merged into the data group D', whereas other image data for normal transmission is transmitted to a designated recipient immediately by real time transmission (b-2). In FIG. 2C, a group of image data D' stored in the box 5a is simultaneously transmitted to respective recipients for batch transmission.

Figure 3:
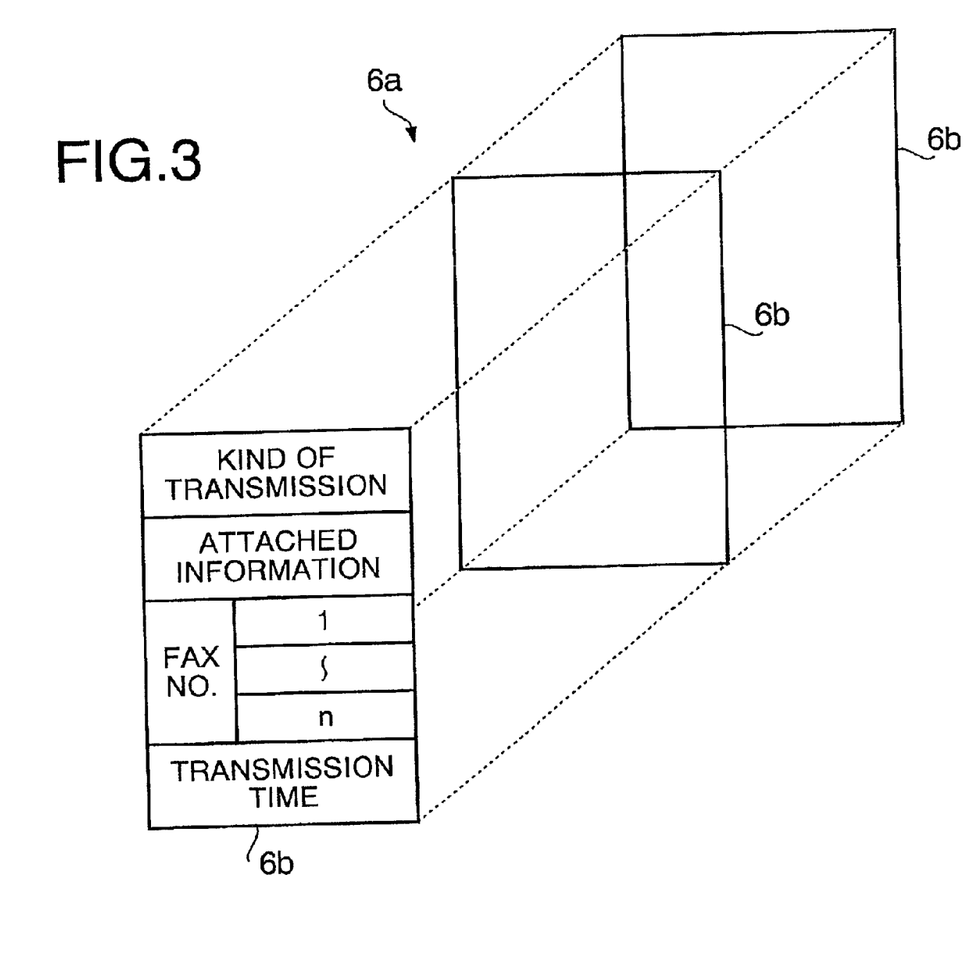
FIG. 3 illustrates box administration information.

FIG. 3 illustrates the box administration information 6a prepared in RAM 6 (FIG. 1). There may be a plurality of memory boxes 5a. For instance, confidential transmission by batch transmission may be instructed at two different times, or confidential and F code transmissions by batch transmission may be instructed at different times. The box administration information 6a indicates which box 5a is associated with which batch transmission. In the drawing, each reference numeral 6b designates a series of information prepared in correspondence with each box 5a. These pieces of information 6b are part of the box administration information 6a, and each of them has a table or matrix form.

Each group of information 6b includes data about a kind of transmission, attached information, one or more recipient facsimile numbers, time of transmission, etc. The attached information is confidential transmission ID in the case of confidential transmission, sub-address and passcord in the case of F code transmission, and relay instruction number in the case of relay transmission.

Figure 4:
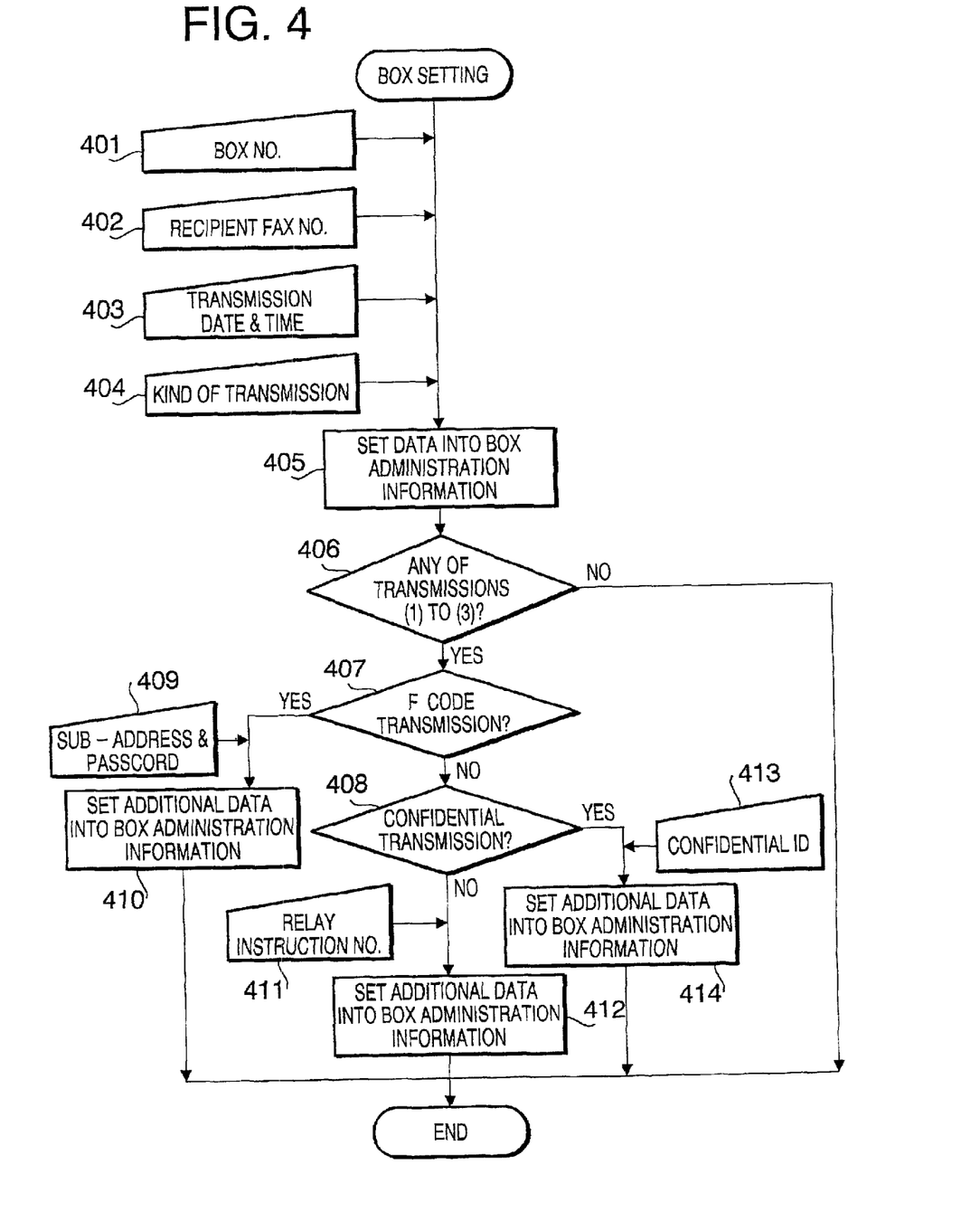
FIG. 4 illustrates a flowchart to set the box administration information.
Figure 5:
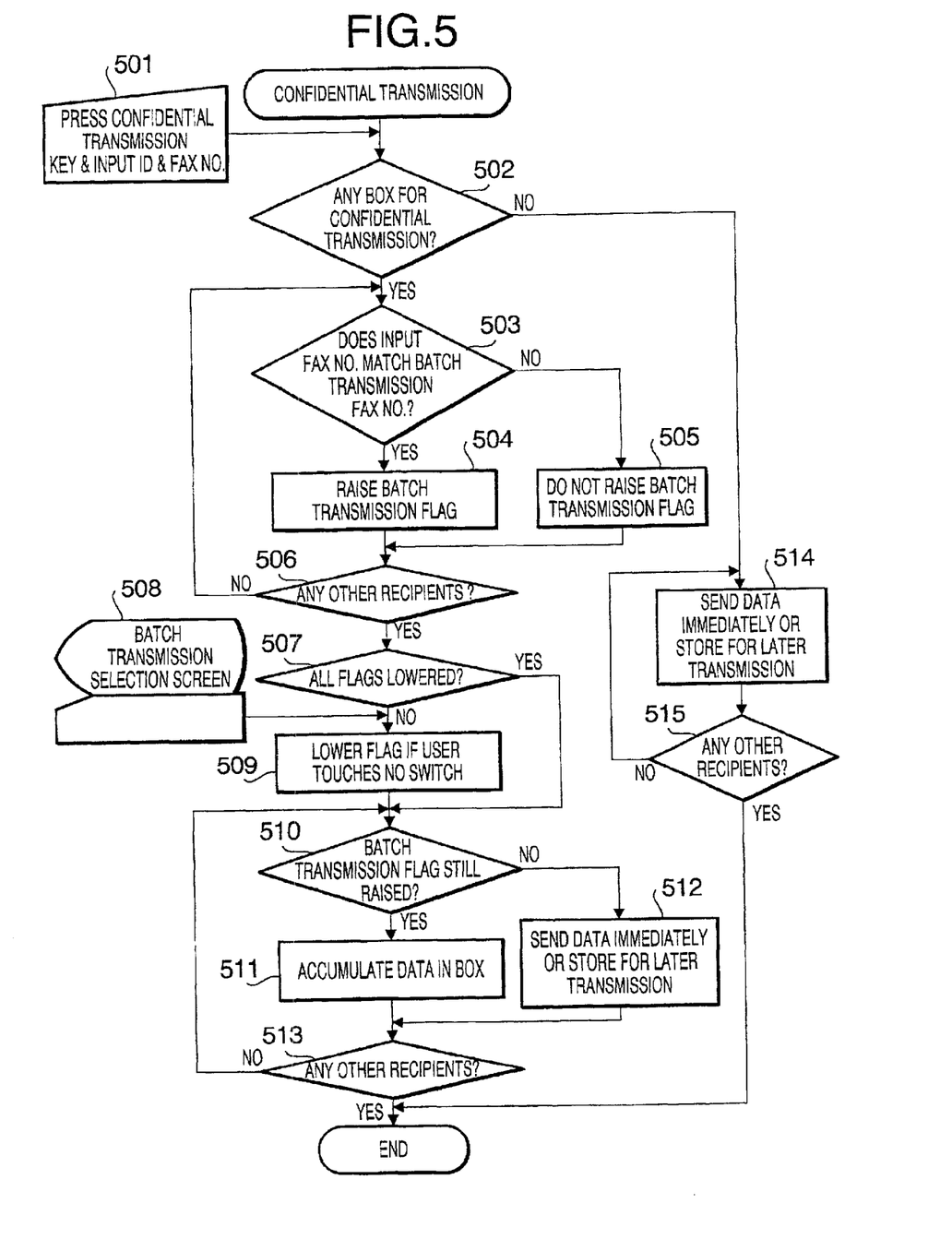
FIG. 5 illustrates a flowchart for confidential transmission.
Figure 6:
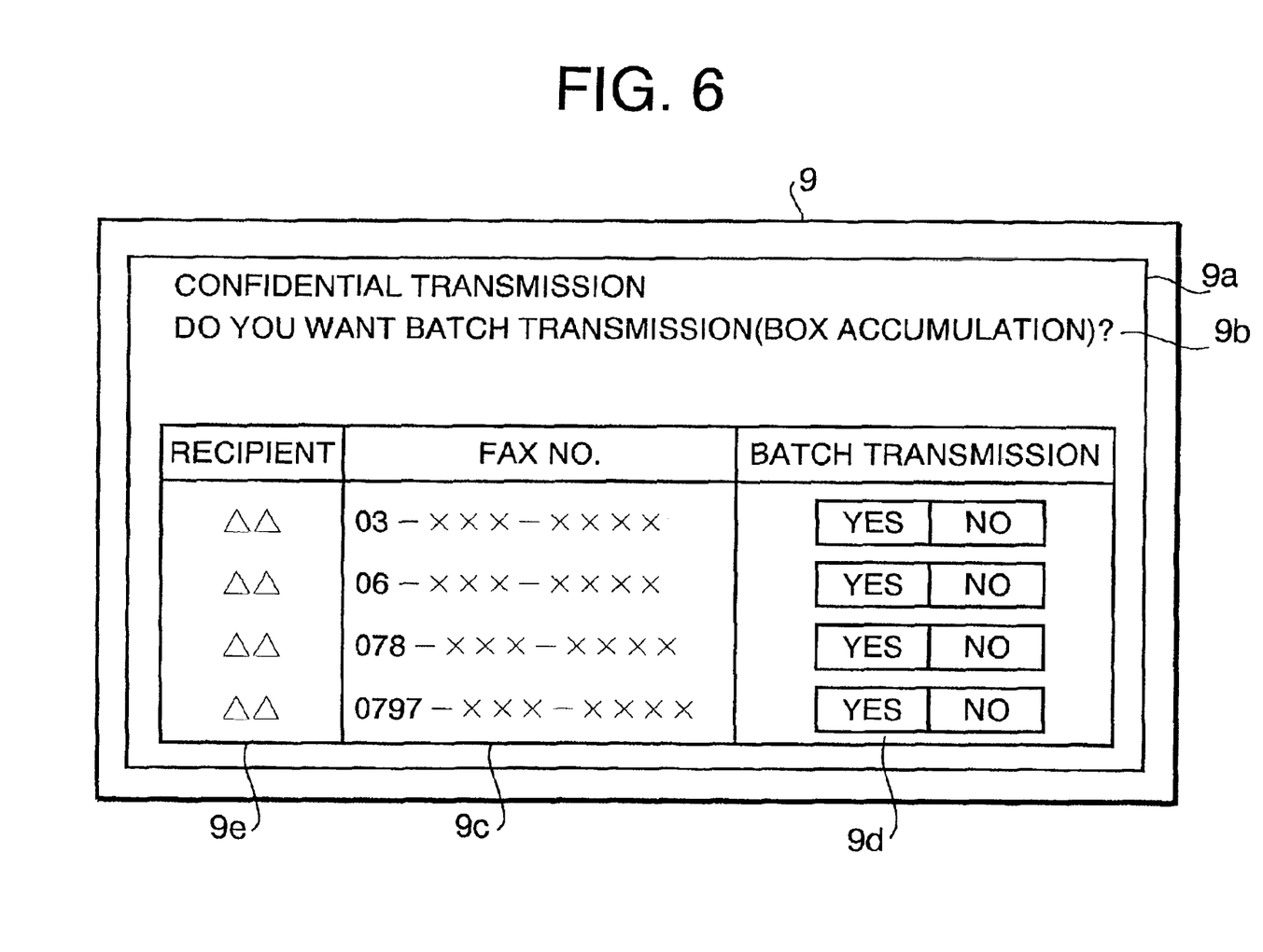
FIG. 6 illustrates a display or touch panel when a user selects a batch transmission.

Referring to FIGS. 4, 5 and 6, will be described a fundamental operation of the facsimile machine F when it sends image data to recipients by batch transmission using the memory boxes 5a and box administration information 6a.

FIG. 4 illustrates a setting operation for the box administration information 6a (6b) to determine for what purpose a particular memory box 5a is utilized.

A user inputs a box number, one or more recipient facsimile numbers for batch transmission, date and time of transmission, and kind of transmission (e.g., confidential transmission) using the control panel 10 or display 9 (401 to 404). The input data is stored in the respective areas in the box administration information 6b (405). If the kind of transmission is none of the above mentioned three transmission functions (1) to (3), then the program proceeds to END since the user wants to send data via normal transmission such as real time transmission (No at 406).

If the answer at 406 is yes, then the user inputs the attached information. Specifically, the user inputs a sub-address and password in the case of the F code transmission, a confidential transmission ID in the case of confidential transmission, and a relay transmission command number in the case of relay transmission. This attached information is also stored in a predetermined area in the box administration information 6*b* (407 to 414).

In this manner, the box administration information setting is complete. After that, the user is allowed to accumulate a plurality of image data in the memory box 5*a* in accordance with the desired transmission function.

FIG. 5 illustrates an operation when the user wants to send image data by confidential transmission.

First, the user presses a confidential transmission key on the control panel 10 or display 9, and inputs a confidential transmission ID and one or more recipient facsimile numbers (501). If the box administration information 6*a* includes information 6*b* for confidential transmission and the input ID coincides with the attached information of that information 6*b*, then the input facsimile number(s) is (are) compared with those in the information 6*b*. If at least one facsimile number coincides, a batch transmission flag is raised (flag on) on RAM 6 for that (those) recipient(s). If no facsimile numbers coincide, batch transmission flags are not raised (flags off) (502 to 506). It should be noted that an image is scanned and stored in the memory when or after the step 501 is executed.

If the flag is raised at least once, a batch transmission selection screen is indicated on the display 9 for that (or those) recipient(s). Looking at this screen, the user selects or does not select the batch transmission for the respective recipient. If the batch transmission is selected, image data is accumulated in the memory box 5*a* (507, 508). On the other hand, if no flag is raised (all flags off), the display 9 does not present a batch transmission selection screen to the user.

FIG. 6 illustrates a batch transmission selection screen 9*a*. Specifically, this screen 9*a* indicates a guidance 9*b* showing a fact that the input facsimile numbers (501) include batch transmission recipients, a recipient area 9*e*, a facsimile number area 9*c* indicating facsimile numbers of batch transmission recipients, and a selection switch area 9*d* for respective facsimile numbers. The user presses YES or NO in the switch area 9*d*.

Referring back to FIG. 5, if the user presses NO on the display 9, the batch transmission flag for that facsimile number is lowered (509). If the user presses YES, the batch transmission flag is maintained raised.

In this manner, whether a batch transmission is instructed or not is indicated by the flags for respective recipients. If a flag is maintained raised, image data is accumulated in the memory box 5*a*. If a flag is lowered, image data is sent to designated recipients immediately (or stored/reserved for later transmission at specified time). This determination is made for the respective facsimile numbers input by the user (510 to 513) before the program goes to END. It should be noted, however, that once the batch transmission flag is maintained raised (Yes at 510), the operation 511 may be skipped over.

If there is no memory box 5*a* for confidential transmission (No at 502), image data is transmitted to recipient(s) immediately or stored for later transmission (514, 515).

Each time the user instructs the confidential transmission with the same confidential transmission ID, the above described operations are repeated so as to accumulate image data in the memory box 5*a*. When the actual time matches the preset time in the box administration information 6*b*, all the image data D' is sent to designated recipients simultaneously from the memory box 5*a* by batch transmission as shown in FIG. 2C.

It should be noted that F code transmission and relay transmission are carried out in a manner similar to the flowchart shown in FIG. 5 (only the content of the attached information is different) so that description for them is omitted here.

The above described and illustrated facsimile machine is disclosed in Japanese Patent Application No. 11-355363 filed in JPO on Dec. 15, 1999, and the subject application claims the priority of these Japanese Patent Application, the entire disclosure of which is incorporated herein by reference.

What is claimed is:

1. A facsimile apparatus capable of performing batch transmission and other transmissions, comprising:

a memory box for storing a plurality of image data to be sent to at least one recipient;

a facsimile transmission unit for sending the plurality of image data to the at least one recipient from the memory box by batch transmission; and a controller for storing the plurality of image data in the memory box if one or more recipients designated in the other transmissions match at least one of the at least one recipient, wherein the controller allows a user to select whether the plurality of image data should be stored in the memory box or not if one or more recipients designated in the other transmissions match at least one of the at least one recipient.

2. The facsimile apparatus of claim 1, wherein the other transmissions include an F code transmission.

3. The facsimile apparatus of claim 1, wherein the other transmissions include a confidential transmission.

4. The facsimile apparatus of claim 1, wherein the other transmissions include a relay transmission.

5. The facsimile apparatus of claim 1 further including a timer unit for allowing a user to specify time for batch transmission such that the facsimile transmission unit sends the plurality of image data at the specified time.

6. The facsimile apparatus of claim 1 further including a timer unit for allowing a user to specify time for batch transmission such that the facsimile transmission unit sends the plurality of image data at the specified time.

7. The facsimile apparatus of claim 1 further including a display for indicating a selection screen to the user based on a signal from the controller so that the user can select either the plurality of image data should be stored in the memory box or not, and a control panel for allowing the user to input selection made by the user to the controller.

8. A facsimile apparatus capable of performing confidential transmission, F code transmission and relay transmission, comprising:

a memory for storing image data for confidential transmission, F code transmission, and relay transmission if data input by a user matches preset data, wherein the memory has a plurality of memory areas, each being assigned in accordance with a kind of transmission and date and time of transmission; and a facsimile module for sending the image data to a recipient from the memory by batch transmission.

9. The facsimile apparatus of claim 8 further including means for allowing a user to determine whether the image data should be sent to the recipient by batch transmission.

10. The facsimile apparatus of claim 8, wherein a broadcast transmission can be combined with any of the confidential transmission, F code transmission and relay transmission, and the facsimile module can simultaneously send the image data to a plurality of recipients by the confidential transmission, F code transmission or relay transmission.

11. The facsimile apparatus of claim 8 further including a scanner, and wherein the image data stored in the memory is a plurality of images scanned by the scanner at different times.

* * * * *